(12) United States Patent
Gayde et al.

(10) Patent No.: US 7,346,343 B2
(45) Date of Patent: Mar. 18, 2008

(54) METHOD AND APPARATUS FOR ANONYMOUS CALL REDIRECTION IN A WIRELESS NETWORK

(75) Inventors: Ruth Schaefer Gayde, Naperville, IL (US); Wafaa Gobba, Downers Grove, IL (US); Shiyan Hua, Lisle, IL (US); Ahmed N. Zaki, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/722,315

(22) Filed: Nov. 25, 2003

(65) Prior Publication Data

US 2005/0113096 A1    May 26, 2005

(51) Int. Cl.
*H04Q 7/20* (2006.01)
(52) U.S. Cl. .................. 455/417; 455/415; 455/445
(58) Field of Classification Search ............... 455/415, 455/417, 414.1, 413, 412.1, 445, 459, 456.1, 455/567, 466, 461, 517; 379/88.19, 88.2, 379/88.21, 142.01, 142.04, 142.06, 142.09, 379/142.1, 213.01
See application file for complete search history.

(56) References Cited

U.S. PATENT DOCUMENTS

| | | | |
|---|---|---|---|
| 5,509,064 A * | 4/1996 | Welner et al. ......... 379/265.02 |
| 5,511,111 A | 4/1996 | Serbetcioglu et al. | |
| 5,604,792 A * | 2/1997 | Solomon et al. .......... 379/88.23 |
| 5,818,836 A * | 10/1998 | DuVal ......................... 370/389 |
| 6,101,251 A * | 8/2000 | Strickland ............... 379/213.01 |
| 6,341,161 B1 | 1/2002 | Latter et al. | |
| 6,408,177 B1 * | 6/2002 | Parikh et al. ................ 455/415 |
| 6,496,691 B1 | 12/2002 | Easley et al. | |
| 6,510,217 B1 * | 1/2003 | Welch et al. ........... 379/211.02 |
| 6,889,044 B1 * | 5/2005 | Cook .......................... 455/445 |
| 6,999,478 B2 * | 2/2006 | D'Angelo .................... 370/522 |
| 2003/0003927 A1 | 1/2003 | Worsham et al. | |
| 2003/0039344 A1 * | 2/2003 | Mercer .................. 379/142.01 |

OTHER PUBLICATIONS

TIA/EIA Interim Standard, Wireless Intelligent Network, TIA/EIA/IS-771, Jul. 1999, pp. 4-109 through 4-128.
Communication—European Search Report—EP 04 25 6860, no date provided.

* cited by examiner

*Primary Examiner*—Jean Gelin (57) ABSTRACT

A method and system for providing an anonymous call redirection service for wireless service subscribers by implementing service logic within the wireless network to intercept incoming calls for which no calling name or number is available and redirect the calls to an intelligent peripheral device for further processing. In one embodiment, anonymous calls are directed to an intelligent peripheral such as a network-based recording device, which records the caller's name and then repeats or plays this name to the called party, before the call is connected to allow the called party to accept or reject the call.

23 Claims, 10 Drawing Sheets

METHOD AND APPARATUS FOR ANONYMOUS CALL REDIRECTION IN A WIRELESS NETWORK

BACKGROUND OF THE INVENTION

This invention relates to a method and apparatus for anonymous call redirection in a wireless network. More particularly, the invention is directed to providing an anonymous call redirection service for wireless service subscribers by implementing service logic within the wireless network to intercept incoming calls for which no calling name or number is available and redirect the calls to an intelligent peripheral device for further processing. In one embodiment, anonymous calls are directed to an intelligent peripheral such as a network-based recording device, which records the caller's name and then repeats or plays this name to the called party, before the call is connected, to allow the called party to accept or reject the call.

While the invention is particularly directed to the art of anonymous call redirection, and will be thus described with specific reference thereto, it will be appreciated that the invention may have usefulness in other fields and applications. For example, the invention may be used in other implementations where intercepting a call in a wireless network would be useful prior to connecting the called party to the calling party.

By way of background, anonymous call redirection services are well defined and available in wire line networks. These services allow for redirection of anonymous calls to recording devices. The caller is then prompted at the recording device to identify itself in a manner so that the called party will be informed of the identity of the caller (e.g., recording a name). Typically, once the caller is subsequently identified to the called party by, for example, playing back the recorded data to the called party, the called party is requested to press certain keys to accept, reject, or send the call to voice mail. In this way, the anonymous wire line call is intercepted and no ringing of the called party phone is accomplished until the caller identifies itself. Other types of anonymous call redirection for wire line networks are known. One of these also involves accessing a database to determine whether a calling party should be connected to a called party.

Notably, there is no known wireless equivalent to such anonymous call redirection. No service provider currently provides such a feature. Indeed, implementation of anonymous call redirection in a wireless network would necessarily be different than that for a wire line network. In this regard, a call is passed through many different entities in a wireless network. In a wire line network, a call is always connected through the same line from one party to another. As a result, implementation of anonymous call redirection in a wireless environment has heretofore been difficult and unrealized.

The present invention contemplates a system for anonymous call redirection in a wireless network that resolves the above-referenced difficulties and others.

SUMMARY OF THE INVENTION

A method and apparatus for anonymous call redirection are provided.

In one aspect of the invention, a method includes receiving a call from a first device of a first party to a second device of a second party, the second device being a wireless device, attempting to deliver the call to the second device, determining if the call is an anonymous call, forwarding the call to an intelligent peripheral if the call is an anonymous call, requesting identification information from the first party, receiving the identification information, attempting to deliver the call to the second device, notifying the second device of the call, requesting connection information from the second party on whether the second device will receive the call, receiving the connection information and selectively connecting the call based on the connection information.

In another aspect of the invention, determining if the call is an anonymous call comprises analyzing a location request message.

In another aspect of the invention, determining if the call is an anonymous call comprises analyzing a send routing information request message.

In another aspect of the invention, determining if the call is an anonymous call comprises accessing a database module.

In another aspect of the invention, determining if the call is an anonymous call is based on whether calling party information is provided by the first party.

In another aspect of the invention, determining if the call is an anonymous call is based on a presentation indicator.

In another aspect of the invention, attempting to deliver the call comprises sending a location request.

In another aspect of the invention, the location request does not identify the first party or has a presentation indicator of the first party marked as restricted.

In another aspect of the invention, the location request identifies the calling party as a network element.

In another aspect of the invention, the network element is an intelligent peripheral.

In another aspect of the invention, the location request takes the form of a send routing information message.

In another aspect of the invention, a system comprises means for accomplishing the method.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

The present invention provides call redirection service in a wireless network for anonymous calls that arrive at a mobile station of a wireless service subscriber. The subject system, through service logic provided in a network element such as a home location register (HLR) (or a service control point (SCP)), sends anonymous calls to an intelligent peripheral, such as a recording device (which typically asks the caller to "Please speak your name"), to obtain identification information from the caller before connecting the call to the called party. As will be described in greater detail below, the obtained information, i.e., recorded data, is used to identify the caller to the called party. The called party can then assume control of whether to accept the call or reject the call based on the identification. In this way, anonymous call redirection is provided to wireless networks, a feature not heretofore known.

Figure 1:
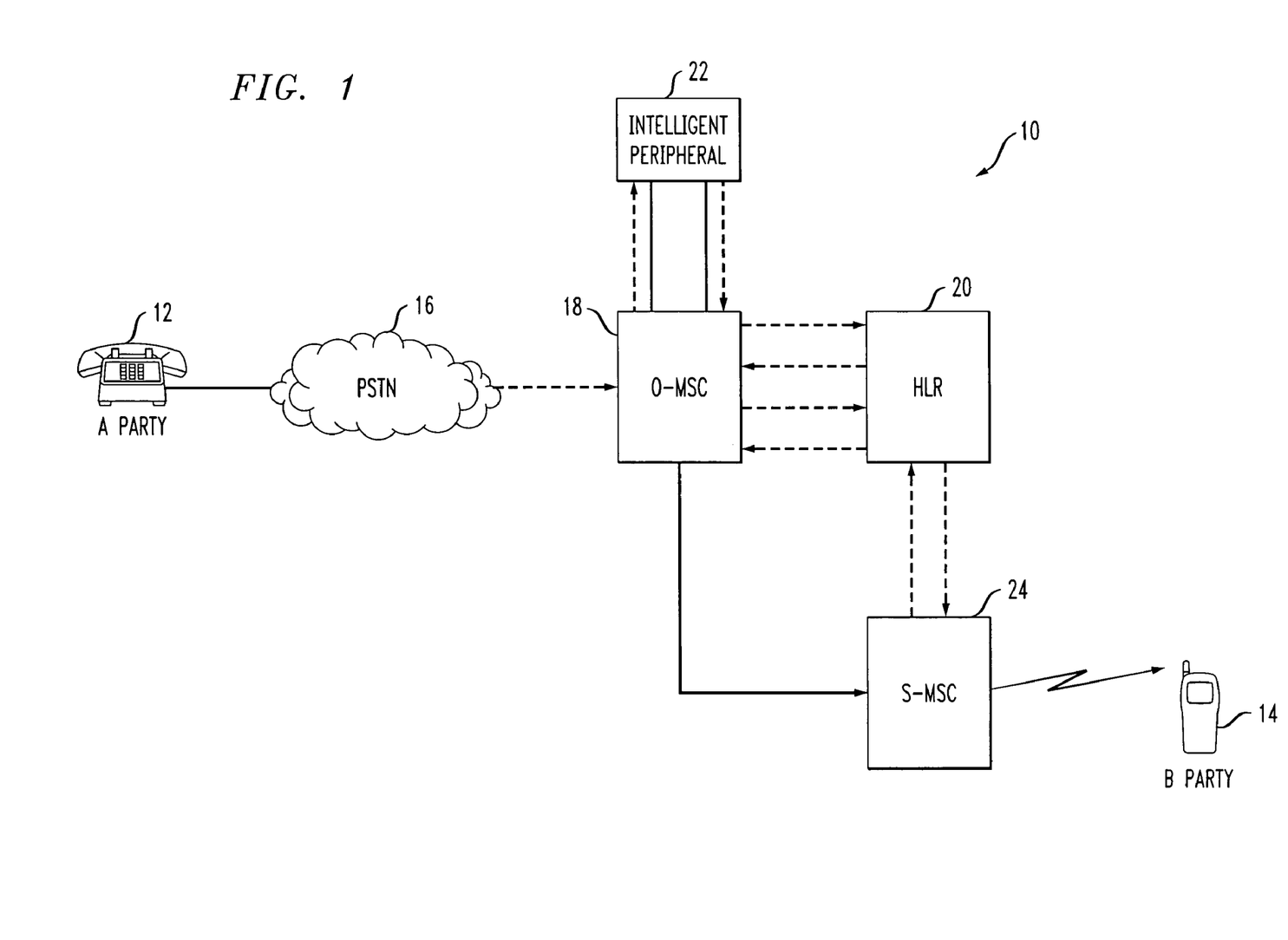
FIG. 1 is a block-diagram of a network incorporating the present invention.

Referring now to the drawings wherein the showings are for purposes of illustrating the preferred embodiments of the invention only and not for purposes of limiting same, FIG. 1 provides a view of an exemplary network into which the present invention may be implemented. As shown, the network 10 includes a variety of common network elements, some of which are modified to accommodate the present invention.

Specifically, the network 10 provides for a communication between the calling party 12 and a called party, i.e., a wireless subscriber, 14. The calling party may originate a call from any of a variety of network elements, including a standard telephone through a public switched telephone network (PSTN) 16. Because the call is to a wireless subscriber 14, the call is connected to an originating mobile switching center (O-MSC) 18 in the wireless network. The originating mobile switching center (O-MSC) 18 is in communication with a home location register (HLR) 20 and also with intelligent peripheral 22. As shown, a serving mobile switching center (S-MSC) 24 is also provided. Of course, it should be understood that the originating mobile switching center (O-MSC) and the serving mobile switching center (S-MSC) 24 will be the same in the case where the mobile station of a called party is registered or currently active in the originating mobile switching center (O-MSC). Those of skill in the art will recognize these differences.

In operation, an incoming call with calling party information missing or marked as restricted arrives at the subscriber's home, or originating, mobile switching center (O-MSC) 18. The originating mobile switching center (MSC) 18 signals the subscriber's home location register (HLR) 20 to obtain the subscriber's location routing information. This is typically accomplished using ordinary ANSI-41 (American National Standard Institute) call delivery procedures (i.e., sending LOCREQ message). If the location request sent by the originating mobile switching center (MSC) 18 does not contain the calling party information, the home location register (HLR) 20 instructs the originating mobile switching center (MSC) 18 to route the call to an intelligent peripheral network element 22 where existing call screening service logic resides. For example, when the call arrives at the intelligent peripheral 22, the caller is prompted to record a message to identify him/her self. After the recording is successfully completed, the caller is put on hold and the call is routed back to the originating mobile switching center (O-MSC) 18, which proceeds with the call delivery attempt to the service subscriber. The call ultimately arrives at the subscriber's serving mobile switching center (S-MSC) 24. Upon answer, the intelligent peripheral network element 22 plays the recorded message and offers the subscriber options to either accept or reject the call. If the subscriber accepts the call, the caller and the service subscriber are connected. Otherwise the call is torn down.

Figure 2:
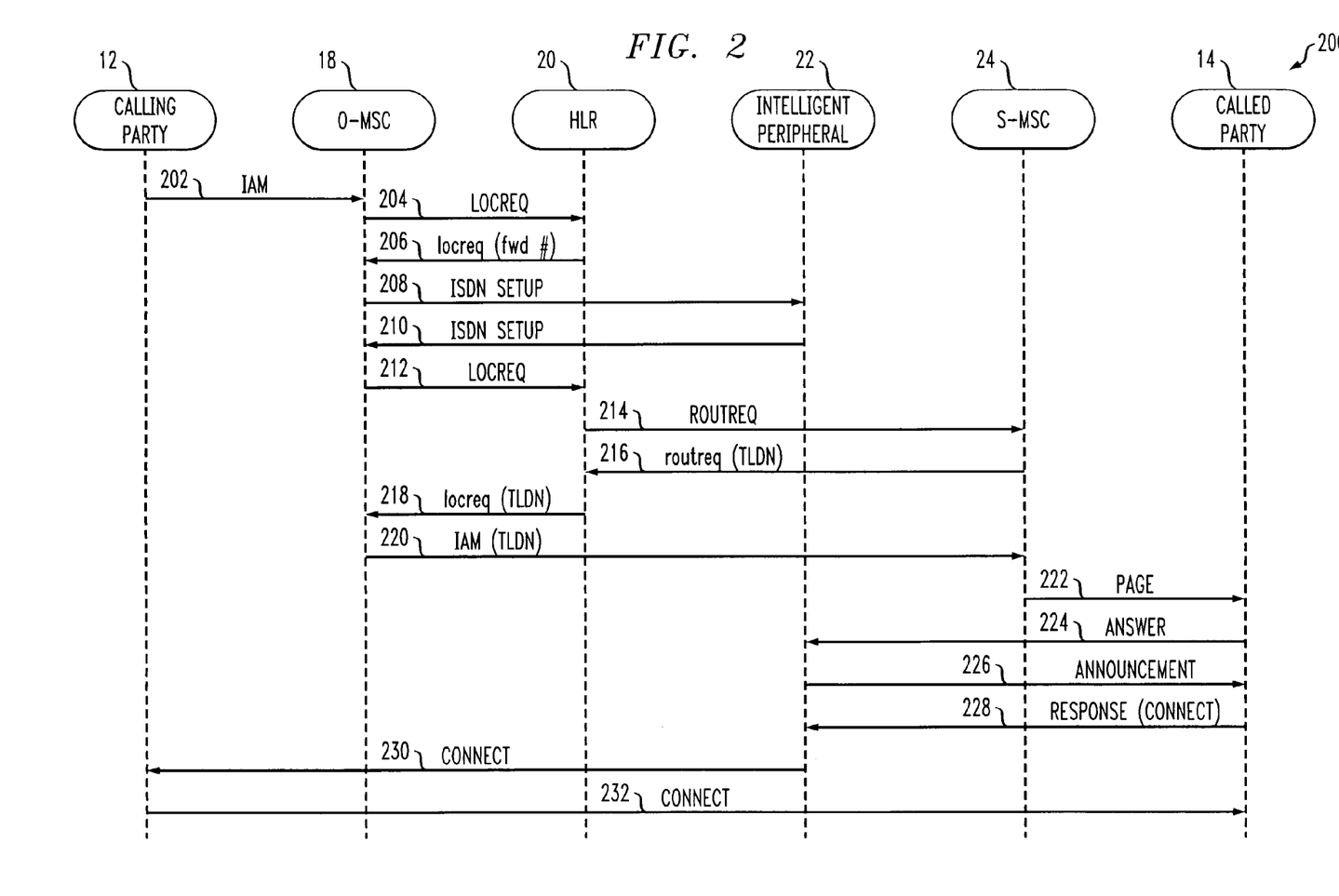
FIG. 2 is a call flow according to the present invention.

Referring now to FIG. 2, a call flow 200 according to the present invention is illustrated. This call flow illustrates further details of the method implemented in the network 10 of FIG. 1 according to the present invention.

Initially, the incoming call from a calling party arrives at the subscriber's originating mobile switching center (O-MSC) 18 (at 202). The call may be conveyed through other network elements (not shown) before arriving at the originating mobile switching center. If the call was using ISUP (Integrated Services digital network User Part) signaling (which is an example of a signaling protocol that may be used), the first message received would be an IAM (initial address message) which typically includes calling/called party data such as CgPN=A and CdPN=B—which serve to identify the calling party as "A" and the called party as "B." The CgPN information would also typically include the Presentation Indicator, which would indicate whether A's number could be presented to B, or if it was restricted (i.e., "private").

The originating mobile switching center (O-MSC) 18 sends a location request, i.e., LOCREQ (B), to the home location register via a signaling protocol such as ANSI-41 signaling (step 204). The home location register (HLR) 20 examines the LOCREQ message and determines whether the calling party number (CgPN) of A is either missing or is set to "Presentation Restricted."

If so, the home location register (HLR) 20 then detects that this subscriber has the anonymous call redirection service turned on in his subscriber record. This is accomplished using any of a variety of known techniques. So, the home location register (HLR) 20 responds to the O-MSC with a locreq return result having included therein a "forward-to" number (at 206). The "forward-to" number is the number of the intelligent peripheral 22, and will preferably be the same for all subscribers to this service. The field that carries the forward-to number is already existing in the art.

The originating mobile switching center (O-MSC) 18 directs the call out to the "forward-to" number, which is the intelligent peripheral 22 (at 208). The interface to the intelligent peripheral 22 in this diagram is ISDN (Integrated Services Digital Network), although other interfaces (e.g., ISUP) could be used. At this point the intelligent peripheral 22 will prompt the calling party A to record his name, and A says "George Burdell," for example.

The intelligent peripheral 22 will set up a return call back to the originating mobile switching center (O-MSC) 18, with the CdPN=B and CgPN=the number of the intelligent peripheral (at 210).

The originating mobile switching center (O-MSC) 18 then sends a LOCREQ (B) to the home location register (HLR) 18 (at 212). This time, when the home location register receives the LOCREQ, it will see that the CgPN=the number of the intelligent peripheral, and so it will not redirect the call out to the intelligent peripheral 22 again.

Rather, the home location register (HLR) 20 sends a routing request, i.e., ROUTREQ, to the serving mobile switching center (S-MSC) 24 to obtain a TLDN (Temporary Local Directory Number) (at 214). Note that steps shown at 214, 216, 218 will not occur if the serving mobile switching center (S-MSC) is the same as the originating mobile switching center (O-MSC) (i.e., mobile is not roaming anywhere).

The serving mobile switching center (S-MSC) 24 sends back the routreq return result with the TLDN (at 216).

The home location register (HLR) passes this TLDN back to the O-MSC (at 218).

The originating mobile switching center (O-MSC) 18 sends the call out over call delivery trunks to the serving mobile switching center (S-MSC) 24 with CdPN=TLDN (at 220).

The mobile B is paged (at 222), and then answers (at 224). In more general terms, the mobile B is notified of an incoming call and responds.

When the intelligent peripheral 22 detects that the mobile has answered, the intelligent peripheral 22 will announce, based on the recorded data, "George Burdell is calling. Press 1 to accept the call," for example (at 226).

The mobile B presses 1 to accept the call (at 228).

The intelligent peripheral 22 detects the "1" pressed by the user and ties together the 2 parties A and B (230, 232). Of course, the called party 14 could also not accept the call. In this case, the call would be terminated or sent to a voice mail system.

This architecture shows that the call remains trunked through the intelligent peripheral 22 for the duration of the call. Other methods could also be used, such as ISUP Release Link Trunking or ISDN Two B-Channel Transfer, which would join the call legs together at the originating mobile switching center (O-MSC) 18 and remove the intelligent peripheral 22 from the talking path after the called user accepts the call.

Figure 3:
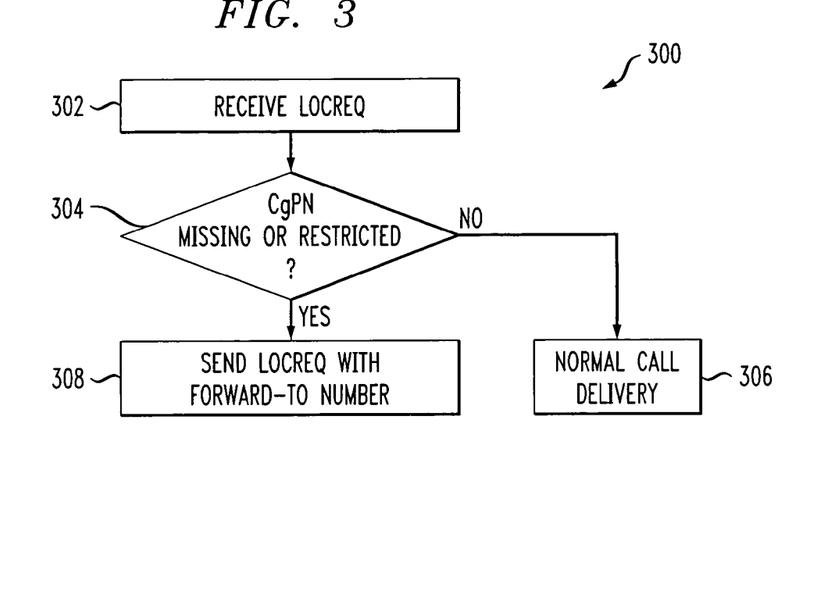
FIG. 3 is a flow chart illustrating a method according to the present invention.

Referring now to FIG. 3, a flow chart illustrating a method 300 representing the service logic according to the present invention is illustrated. This service logic is preferably the logic under which the home location register (HLR) 20 operates to implement the present invention. Specifically, the method 300 begins with the receipt by the home location register (HLR) 20 of a location request (step 302). At this point, the HLR determines if a calling party number is missing from the location request or identified as being "presentation restricted" (step 304). If not, normal call delivery is accomplished (step 306). If, however, the calling party number is missing or identified as being restricted, then the service logic of the HLR sends a location request back to the originating mobile switching center (O-MSC) 18 along with a "forward-to" number, where the forward-to number is that of the intelligent peripheral 22 (step 308). It will be appreciated from the description of FIG. 2, the service logic in the home location register (HLR) 20 will treat a subsequent location request having the calling party identified as the intelligent peripheral 22, as a normal call and will simply revert to normal call delivery status and allow for the further processing.

Figure 4:
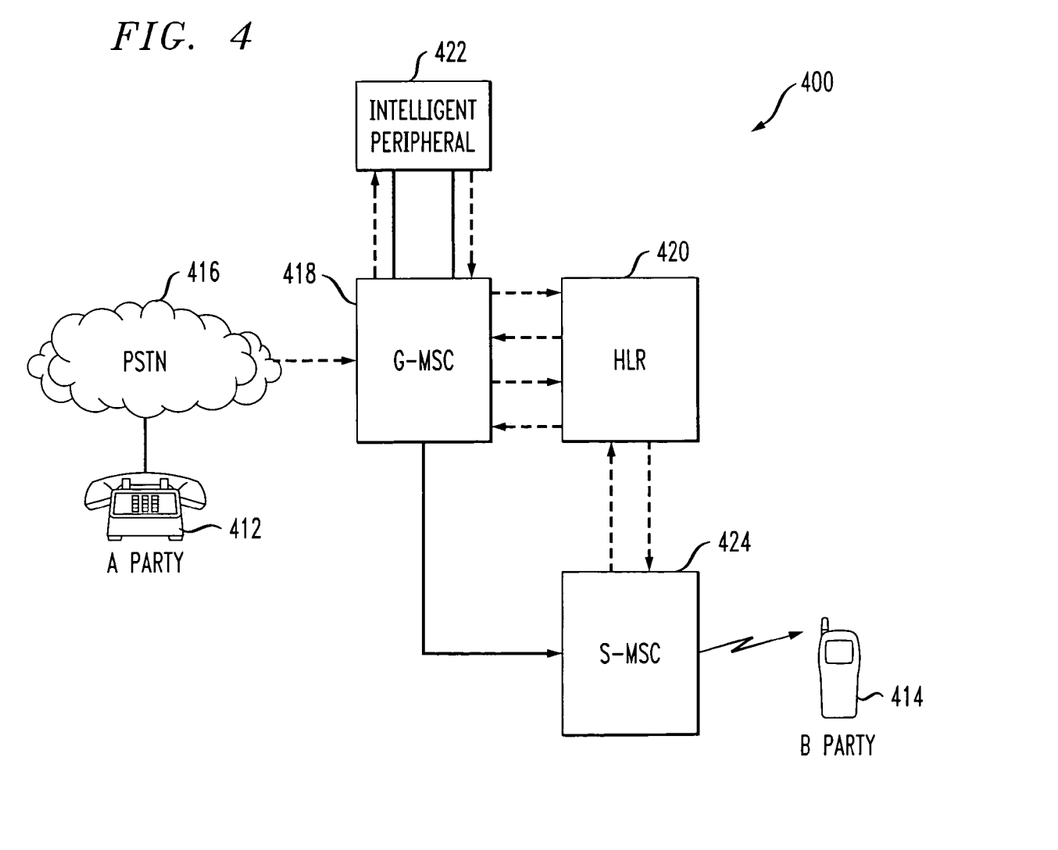
FIG. 4 is a block diagram of a network according to another embodiment of the present invention.

Referring now to FIG. 4, the present invention as implemented in a GSM environment is illustrated. In this Figure, SRI represents a GSM/UMTS MAP message for SendRoutingInformation, PRN represents a GMS/UMTS MAP message for ProvideRoamingNumber, MSRN represents Mobile Station Roaming Number, and G-MSC represents a Gateway MSC.

As shown, the network 400 provides for communication between a calling party 412 and a called party, i.e., a wireless subscriber 414. The calling party may originate a call from a variety of network elements, including a standard telephone through a public switched telephone network (PSTN) 416. Because the call is to a wireless subscriber 414, the call is connected to a gateway mobile switching center (G-MSC) 418 in the wireless network. The gateway mobile switching center (G-MSC) 418 is in communication with a home location register (HLR) 420 and also with intelligent peripheral 422. As shown, a serving mobile switching center (S-MSC) 424 is also provided. Of course, it should be understood that the originating mobile switching center (O-MSC) and the serving mobile switching center (S-MSC) 424 will be the same in the case where the mobile station of the called party is registered or currently active in the originating mobile switching center. Those of skill in the art will recognize these differences.

The operation of the network illustrated in FIG. 4 is similar to that of the operation illustrated in connection with FIG. 1. However, the components differ slightly. In this regard, instead of an originating mobile switching center, a gateway mobile switching center (G-MSC) 418 is provided. Moreover, as will be apparent from FIG. 5, the form and protocol of the messaging and signaling provided between elements to implement the invention necessarily differs from that of the network of FIG. 1.

Figure 5:
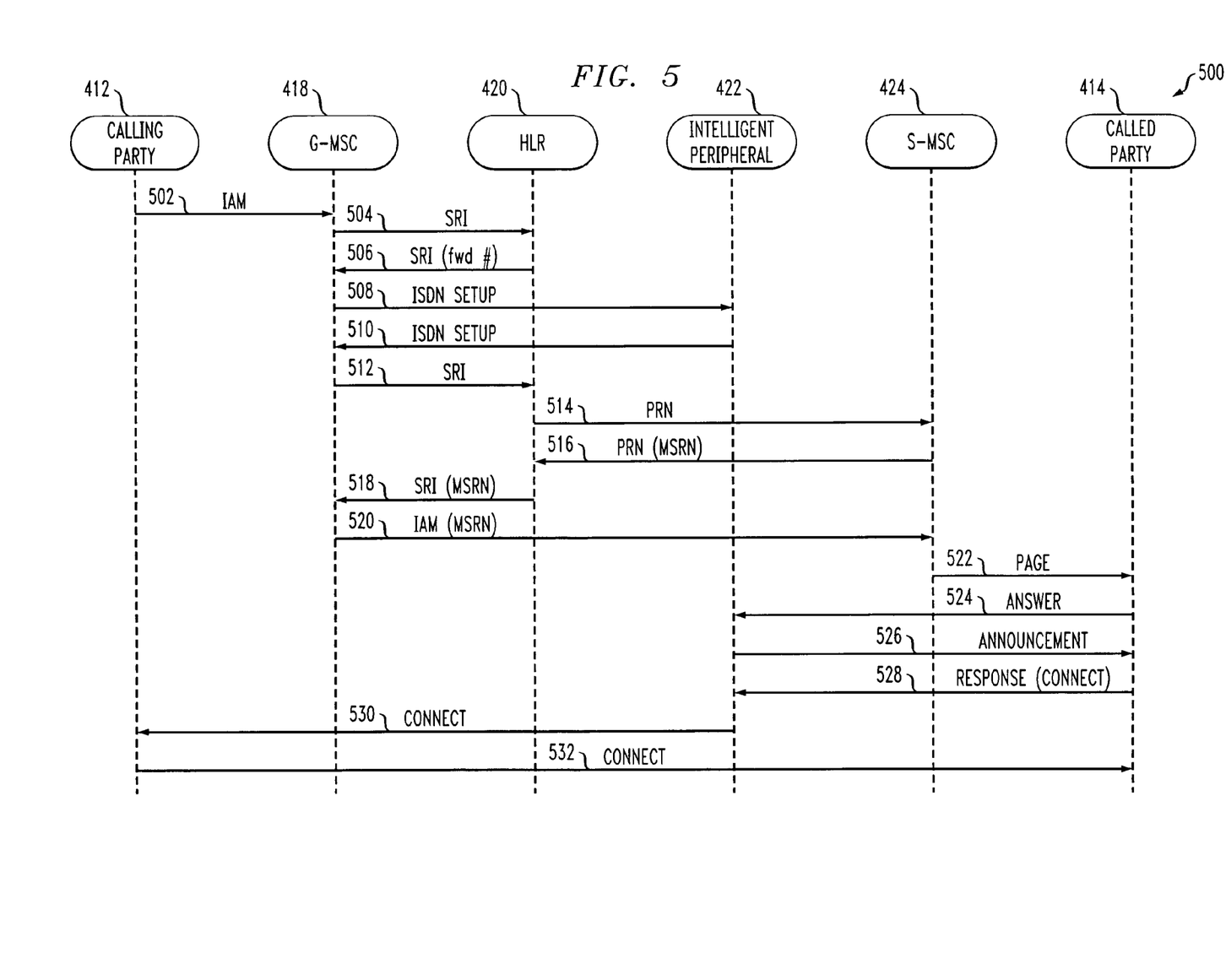
FIG. 5 is a call flow according to the present invention.

In this regard, FIG. 5 illustrates a call flow 500 showing a method of the present invention as implemented in GSM network 400 of FIG. 4. This call flow 500 is similar to that of FIG. 2; however, it can be seen that a location request in GSM terms is a Send Routing Information (SRI) message or request. In addition, the routing request (ROUTREQ), in GSM terms, is referred to as a Provide Roaming Number (PRN) message.

Initially, the incoming call from a calling party arrives at the subscriber's gateway mobile switching center (G-MSC) 418 (at 502). The call may be conveyed through other network elements (not shown) before arriving at the originating mobile switching center. If the call was using ISUP signaling (which is an example of a signaling protocol that may be used), the first message received would be an IAM (initial address message) which typically includes calling/called party data such as CgPN=A and CdPN=B—which serve to identify the calling party as "A" and the called party as "B." The CgPN information would also typically include the Presentation Indicator, which would indicate whether A's number could be presented to B, or if it was restricted (i.e., "private").

The gateway mobile switching center (G-MSC) 418 sends a routing information request, i.e., SRI message, to the home location register (HLR) 420 via a signaling protocol such as GSM MAP signaling (step 504). The home location register (HLR) 420 examines the SRI message and determines whether the calling party number (CgPN) of A is either missing or is set to "Presentation Restricted."

If so, the home location register (HLR) 420 then detects that this subscriber has the anonymous call redirection service turned on in his subscriber record. This is accomplished using any of a variety of known techniques. So, the home location register (HLR) 420 responds to the G-MSC with an SRI acknowledgement or response having included therein a "forward-to" number (at 56). The "forward-to" number is the number of the intelligent peripheral 42, and will preferably be the same for all subscribers to this service. The field that carries the forward-to number is already existing in the art.

The gateway mobile switching center (G-MSC) 418 directs the call out to the "forward-to" number, which is the intelligent peripheral 422 (at 508). The interface to the intelligent peripheral 422 in this diagram is ISDN, although other interfaces (e.g., ISUP) could be used. At this point the intelligent peripheral 422 will prompt the calling party A to record his name, and A says "George Burdell," for example.

The intelligent peripheral 422 will set up a return call back to the gateway mobile switching center (G-MSC) 418, with the CdPN=B and CgPN=the number of the intelligent peripheral (at 510).

The gateway mobile switching center (G-MSC) 418 then sends an SRI message to the home location register (HLR) 418 (at 512). This time, when the home location register receives the SRI message, it will see that the CgPN=the number of the intelligent peripheral, and so it will not redirect the call out to the intelligent peripheral 422 again.

Rather, the home location register (HLR) 420 sends a roaming number message, i.e., PRN message or request, to the serving mobile switching center (S-MSC) 424 to obtain a MSRN (at 514). Note that steps shown at 514, 516, 518 will not occur if the serving mobile switching center (S-MSC) is the same as the gateway mobile switching center (G-MSC) (i.e., mobile is not roaming outside the G-MSC).

The serving mobile switching center (S-MSC) 424 sends back the PRN acknowledgement or response with the MSRN (at 516).

The home location register (HLR) passes this MSRN back to the G-MSC (at 518).

The gateway mobile switching center (O-MSC) 418 sends the call out over call delivery trunks to the serving mobile switching center (S-MSC) 424 with CdPN=MSRN (at 520).

The mobile B is paged (at 222), and then answers (at 524). Of course, in more general terms, the mobile B is notified of an incoming call and responds.

When the intelligent peripheral 422 detects that the mobile has answered, the intelligent peripheral 422 will announce, based on the recorded data, "George Burdell is calling. Press 1 to accept the call," for example (at 526).

The mobile B presses 1 to accept the call (at 528).

The intelligent peripheral 422 detects the "1" pressed by the user and ties together the parties A and B (530, 532). Of course, the called party 414 could also not accept the call. In this case, the call would be terminated or sent to a voice mail system.

Figure 6:
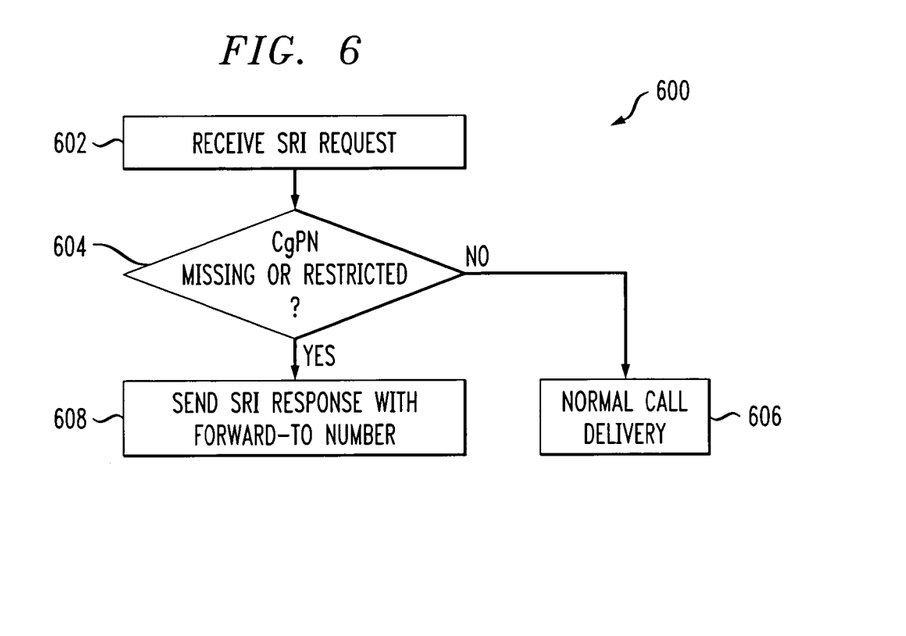
FIG. 6 is a flow chart illustrating a method according to the present invention.

Referring now to FIG. 6, the service logic stored within the home location register (HLR) 420 of the network of FIG. 4, is illustrated. This method 600 is initiated by receipt of a Send Routing Information (SRI) message at the home location register (step 602). The home location register (HLR) 420 then determines whether the calling party number is missing from the message or restricted (step 604). If not, normal call delivery is accomplished (step 606). If, however, the calling party number is missing or restricted, the HLR sends a Send Routing Information (SRI) acknowledgement back to the gateway mobile switching center (GMSC) 418 with a "forward-to" number therein (step 608). The forward-to number is that of the intelligent peripheral 422 which then processes the information as described in connection with FIGS. 2 and 4.

Figure 7:
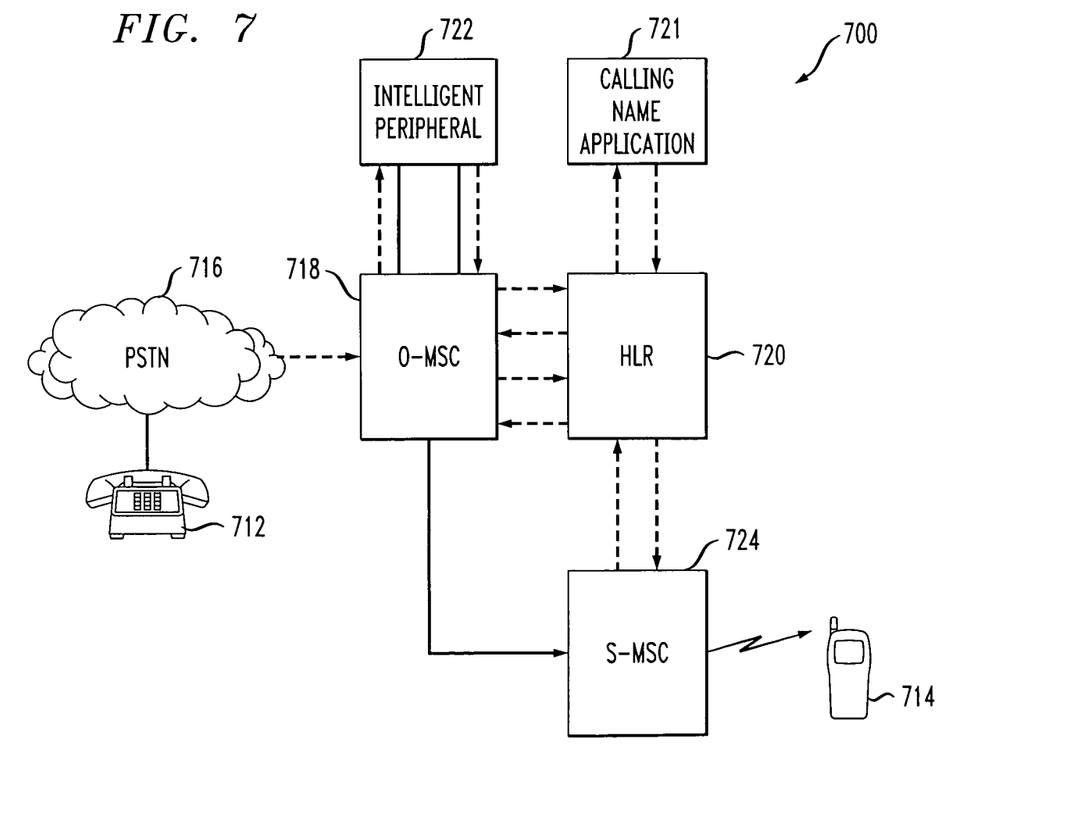
FIG. 7 is a block diagram of a network according another embodiment of the present invention.

Another embodiment of the invention is illustrated in FIG. 7. Here, a calling name application module 721 is also provided to a network resembling that of FIG. 1. This module includes a database storing either numbers that can be connected to the calling party or those that cannot be connected. This service architecture is described using ANSI-41 messaging. However, one skilled in the art could also implement this with corresponding GSM protocol messages instead of the ANSI-41 messages here.

As shown, the network 700 provides for a communication between the calling party 712 and a called party, i.e., a wireless subscriber 714. The calling party may originate a call from a variety of network elements, including a standard telephone to a public switched telephone network (PSTN) 716. Because the call is to a wireless subscriber 714, the call is connected to an originating mobile switching center (O-MSC) 718 in the wireless network. The originating mobile switching center (O-MSC) 718 is in communication with a home location register (HLR) 720 and also with an intelligent peripheral 722. It should be appreciated that in this embodiment, the home location register (HLR) 720 is also in communication with a calling name application module 721. In one form, a serving mobile switching center (S-MSC) 724 is also provided. Of course, the serving mobile switching center (S-MSC) 724 will not be necessary in the case where the mobile station of the called party is registered or currently active in the originating mobile switching center. Those of skill in the art will recognize these differences.

Figure 8:
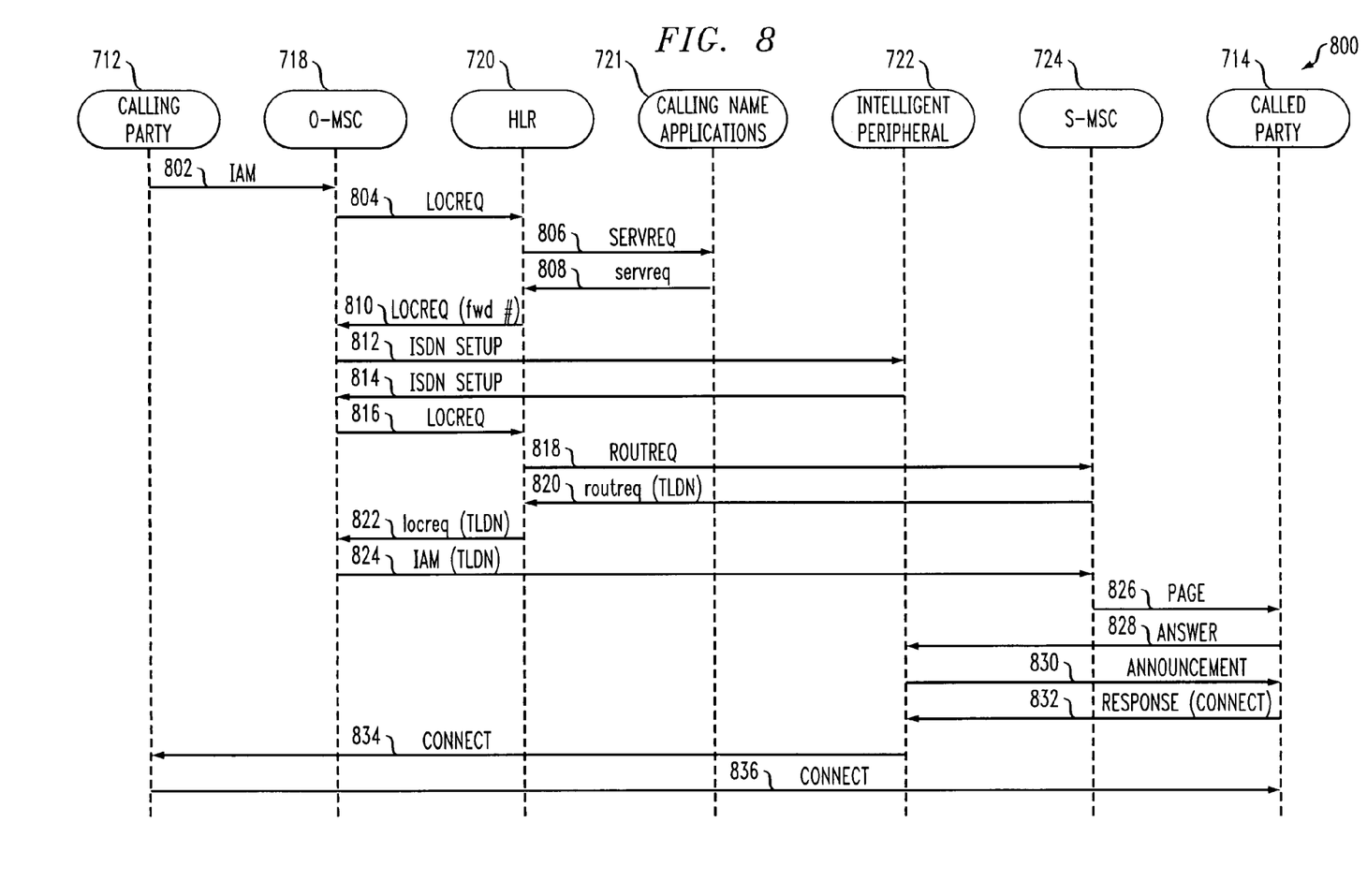
FIG. 8 is a call flow according to the present invention.

Referring now to FIG. 8, a call flow 800 illustrating the method implemented in the network of FIG. 7 is illustrated. As shown, the incoming call from a called party arrives at the subscriber's originating mobile switching center (MSC), with CgPN=A and CdPN=B (at 802). The call may be conveyed through other network elements (not shown) before arriving at the originating mobile switching center.

The originating mobile switching center (O-MSC) 718 sends LOCREQ (B) to the home location register (HLR) 720 (at 804).

The home location register (HLR) 720 detects that this subscriber has the call screening service turned on in his subscriber record. The home location register (HLR) sends a service request, such as the ANSI-41 SERVREQ, which includes the calling party number (as described above), to the calling name application 721 (at 806).

The calling name application module 721 looks to see if there is an entry for the CgPN, and sends the result to the home location register (HLR) 720 in the servreq return result message (at 808).

The home location register (HLR) 720 looks at the servreq return result to see whether this call needs special screening treatment (e.g., no name available in calling name database). If so, then the Home Location Register (HLR) 720 responds to the originating mobile switching center (O-MSC) 718 with the locreq return result with a forward-to number (at 810). The forward-to number is the number of the intelligent peripheral, and would likely be the same for all subscribers.

The originating mobile switching center (O-MSC) 718 directs the call out to the forward-to number, which is the intelligent peripheral 722 (at 812). The interface to the intelligent peripheral 722 is ISDN, but other protocols could be used (e.g. ISUP). At this point the intelligent peripheral 722 will prompt the calling party to record his name, and A says "George Burdell," for example.

The intelligent peripheral 722 will set up a return call back to the mobile switching center (MSC), with the CdPN=B (at 814).

The originating mobile switching center (O-MSC) 718 sends a LOCREQ (B) to the home location register (HLR) 720. This time, when the home location register (HLR) 720 receives the LOCREQ, it will see that the CgPN=the number of the intelligent peripheral 720, and so it will not proceed with the SERVREQ query out to the calling name application module 721.

The home location register (HLR) sends a ROUTREQ to the serving mobile switching center (S-MSC) 724 to obtain a TLDN (at 818). Note that selected steps will not happen if the serving mobile switching center (S-MSC) is the same as the originating mobile switching center (O-MSC) (i.e., mobile is not roaming outside the originating MSC).

The serving mobile switching center (S-MSC) 724 sends back the routreq return result with the TLDN (at 820).

The home location register (HLR) 720 passes this TLDN back to the originating mobile switching center (O-MSC) 718 (at 822).

The originating mobile switching center (O-MSC) 718 sends the call out over call delivery trunks to the serving mobile switching center (S-MSC) 724 with CdPN=TLDN (at 824).

The mobile B is paged or otherwise notified of an incoming call (at 826). When the mobile answers (at 828), it will hear the intelligent peripheral playing ""George Burdell" is calling. Press 1 to accept the call, press 2 to deny." in the form of an announcement (at 830).

If the mobile B presses 1 to accept the call (at 832), the call is connected and remains trunked through the intelligent peripheral for the duration of the call (at 834, 836).

Figure 9:
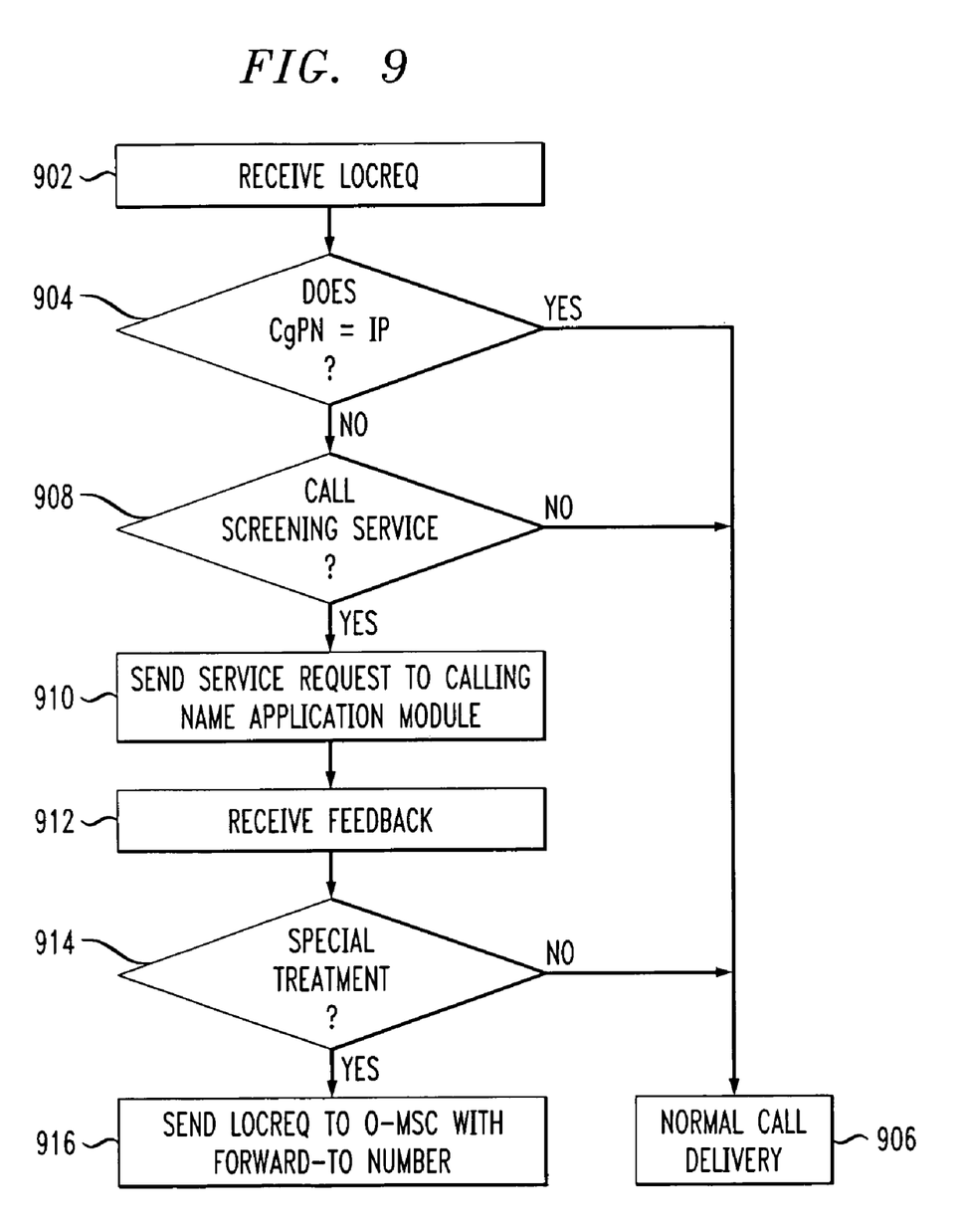
FIG. 9 is a flow chart illustrating a method according to the present invention.

Referring now to FIG. 9, the service logic stored within the home location register (HLR) 720 is illustrated. In this regard, the method 900 is initiated at the receipt of a location request by the home location register (HLR) 720 (step 902). The service logic first determines whether the calling party number is that of the intelligent peripheral 722 (step 904). If so, normal call delivery is conducted (step 906). If not, the home location register (HLR) 720 determines if the call is subject to special call screening service (step 908). If not, normal call delivery is accomplished (step 906). If, however, call screening service is to be applied, a service request is sent to the calling name application module 721 (step 910). The home location register (HLR) 720 then receives feedback from the calling name application module 721 (step 912). Based on this information, it determines if special treatment of the call is necessary (step 914). If not, normal call delivery is accomplished (step 906). If, however, special treatment of the call is required, a location request with a "forward-to" number therein is sent back to the originating mobile switching center (O-MSC) 718 (step 916) and further call processing is described in connection with FIG. 8 is conducted.

Figure 10:
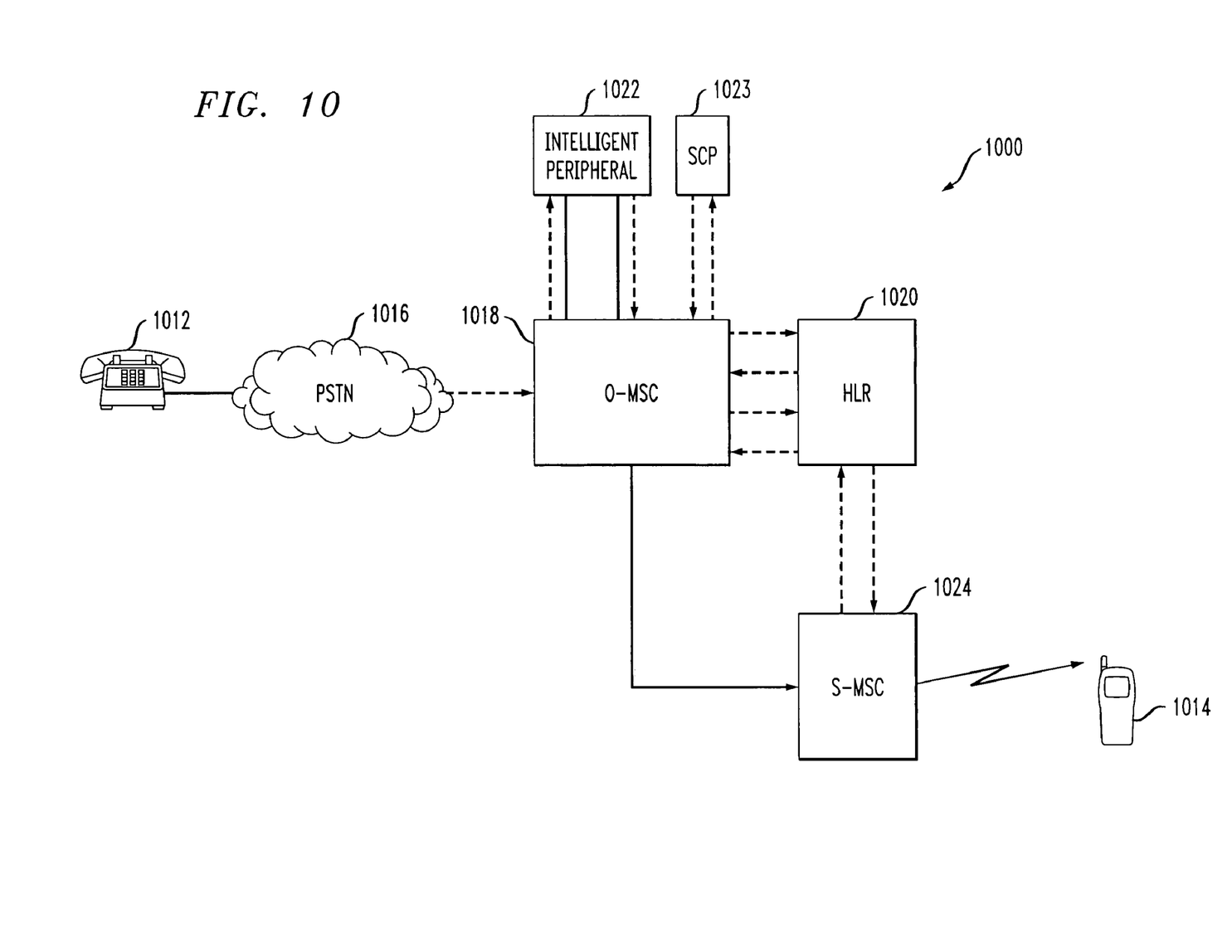
FIG. 10 is a block diagram of a network according to another embodiment of the present invention.

With reference to FIG. 10, an implementation of the invention using service control point (SCP) decision logic is illustrated. This service architecture is described using ANSI-41 messaging. However, one skilled in the art could also implement this with corresponding GSM protocol messages instead of the ANSI-41 messages here.

As shown, the network 1000 provides for communication between the calling party 1012 and a called party, i.e., a wireless subscriber 1014. The calling party may originate a call from a variety of network elements, including a standard telephone through a public switched telephone network (PSTN) 1016. Because the call is to a wireless subscriber 1014, the call is connected to the originating mobile switching center (O-MSC) 1018 in the wireless network. The originating mobile switching center (O-MSC) 1018 is in communication with a home location register (HLR) 1020 and also with an intelligent peripheral 1022. In this embodiment, a service control point (SCP) 1023 is also shown. In one form, a serving mobile switching center (S-MSC) 1024 is also provided. Of course, the serving mobile switching center (S-MSC) 1024 will not be necessary in the case of a call that originates and terminates within the same mobile switching center. Those of skill in the art will recognize these differences.

In operation, the decision on whether to route a call to the intelligent peripheral for call screening treatment would reside in the service control point (SCP) 1023. The IS-771 Advance Termination Trigger would be fired by the originating mobile switching center (O-MSC) 1018 to the SCP 1023 where the logic resides. The Advance Termination-Trigger would be provisioned in the subscriber's Home Location Register (HLR) 1020 record.

Figure 11:
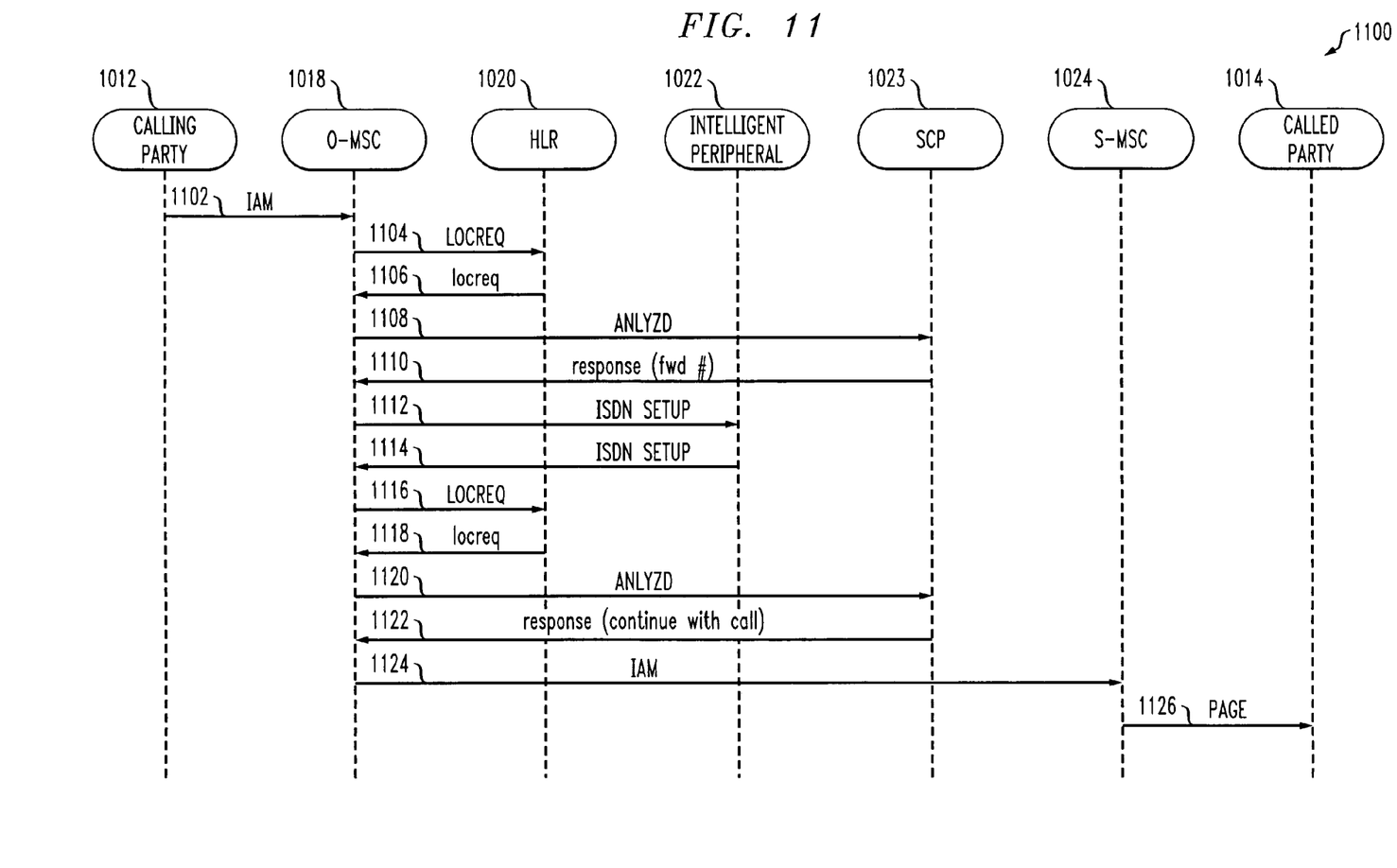
FIG. 11 is a call flow according to the present invention.

Referring now to FIG. 11, the call flow 1100, with A calling B and B subscribing to the call screening service feature, is shown.

The originating mobile switching center (O-MSC) 1018 receives an incoming call for B (at 1102). The call may be conveyed through other network elements (not shown) before arriving at the originating mobile switching center. It sends a LOCREQ to the home location register (HLR) (at 1104).

The home location register (HLR) 1020 dynamically arms the Advance Termination Trigger in the locreq return result (at 1106).

The originating mobile switching center (O-MSC) 1018 sends the Advance Termination Trigger message (ANLYZD) to the SCP where the service logic resides (at 1108). This contains the CgPN=A. The service control point (SCP) 1023 determines whether the call needs to go to the intelligent peripheral 1022 for announcement handling. If yes, then it responds to the originating mobile switching center (O-MSC) 1018 with the forward-to number of the intelligent peripheral 1022 (at 1110).

The originating mobile switching center (O-MSC) 1018 routes the call out to the intelligent peripheral 1022, where "George Burdell" is recorded by the A party (at 1112).

The intelligent peripheral 1022 trunks the call back into the originating mobile switching center (O-MSC) 1018, with CgPN=the number of the intelligent peripheral and CdPN=B (at 1114).

The originating mobile switching center (O-MSC) 1018 sends another LOCREQ to the home location register (HLR) (at 1116). The home location register (HLR) will again dynamically arm the Advance Termination Trigger at the originating mobile switching center (O-MSC) 1018, as in step 1 (at 1118).

Again, the Advance Termination Trigger will fire from the O-MSC to the service control point (SCP) 1023 (at 1120). This time the service control point (SCP) 1027 will recognize that the CgPN=the number of the intelligent peripheral, and so it will respond to the mobile switching center (MSC) with "continue the call" (at 1122).

The originating mobile switching center (O-MSC) 1018 will continue "ordinary" call processing (at 1124), and the B party will eventually be paged or notified as above (at 1126).

When the subscriber decides to take the call, the call will remain trunked through the intelligent peripheral, as in the other approaches contemplated herein.

Figure 12:
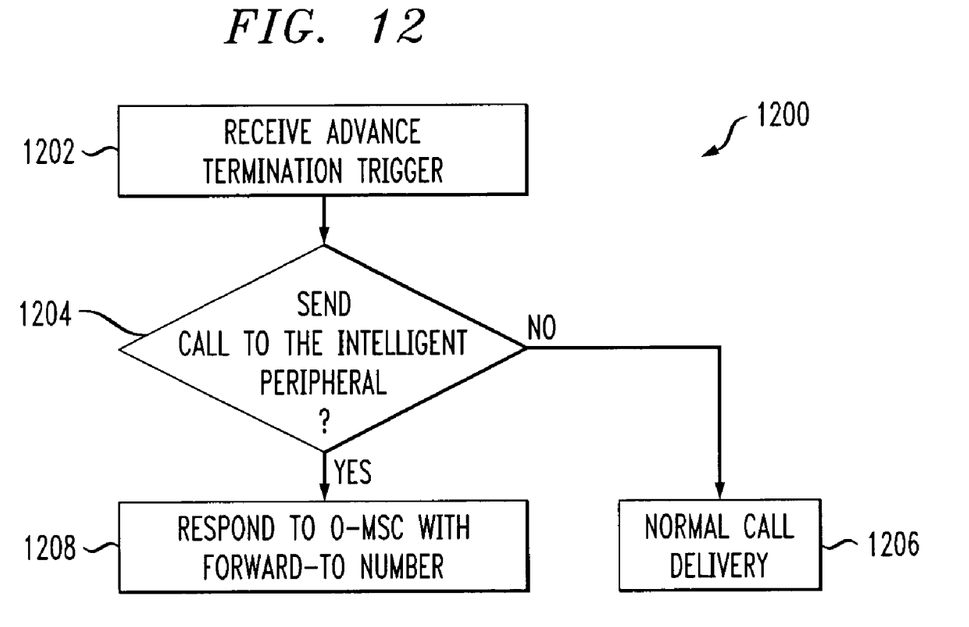
FIG. 12 is a flow chart illustrating a method according to the present invention.

Referring now to FIG. 12, the service logic preferably implemented within the service control point (SCP) 1023, is illustrated. As shown, a method 1200 is illustrated as being initiated by the receipt of an advance termination trigger message from the originating mobile switching center (O-MSC) (step 1202). That is, the MSC reports to the service control point (SCP) via ANLYZD, that the Advanced Termination Trigger is encountered. The service control point (SCP) 1023 then determines whether the calling processing should be sent to the intelligent peripheral 1022 (step 1204). If not, normal call delivery processing is completed (step 1206). It should be understood, based on a description of the call flow of FIG. 11, that this will occur when the calling party number is identified as being that of the intelligent peripheral 1022.

If, however, the service control point (SCP) 1023 determines that call processing should resume with the intelligent peripheral 1022, then the service control point (SCP) 1023 responds to the originating mobile switching center (O-MSC) 1018 with a location request having a "forward-to" number (step 1208). Of course, the forward-to number is that of the intelligent peripheral 1022. It should be understood that step 1208 will be accomplished if the calling party number is missing from the advance termination trigger or if it is determined that the calling party number requires special treatment.

It will be understood that the invention described herein can be implemented in a wireless network using a variety of hardware and software techniques. Preferably, service logic, such as that described in connection with FIGS. 3, 6 and 9, is software that resides in the home location register of the wireless network. Similarly, the service logic described in connection with FIG. 12 is software that resides in the service control point. Of course, the invention should not be so limited. The hardware and software necessary to implement the present invention may also be distributed among network elements or stored on a separate server that is accessible by the network. In addition, the intelligent peripheral identified throughout this application might take a variety of forms. However, in one embodiment, intelligent peripheral will take the form of eMRS network element, supplied by Lucent Technologies Inc.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method for anonymous call redirection in a wireless network, the method comprising:
   receiving a call from a first device of a first party to a second device of a second party, the second device being a wireless device;
   attempting to deliver the call to the second device;
   determining if the call is an anonymous call by at least one of a home location register and a service control point;
   forwarding the call to an intelligent peripheral if the call is an anonymous call;
   requesting identification information from the first party;
   receiving the identification information;
   attempting to deliver the call to the second device;
   notifying the second device of the call;
   requesting connection information from the second party and whether the second device will receive the call;
   receiving the connection information; and,
   selectively connecting the call based on the connection information.

2. The method as set forth in claim 1 wherein determining if the call is an anonymous call comprises analyzing a location request message.

3. The method as set forth in claim 1 wherein determining it the call is an anonymous call comprises analyzing a send routing information request message.

4. The method as set forth in claim 1 wherein determining if the call is an anonymous call comprises accessing a database module.

5. The method as set forth in claim 1 wherein determining if the call is an anonymous call is based on whether calling party information is provided by the first party.

6. The method as set forth in claim 1 wherein determining if the call is an anonymous call is based on a presentation indicator.

7. The method as set forth in claim 1 wherein attempting to deliver the call comprises sending a location request.

8. The method as set forth in claim 7 wherein the location request does not identify the first party or has a presentation indicator of the first party marked as restricted.

9. The method as set forth in claim 7 wherein the location request identifies the calling party as a network element.

10. The method as set forth in claim 9 wherein the network element is an intelligent peripheral.

11. The method as set forth in claim 7 wherein the location request takes the form of a send routing information message.

12. A system for anonymous call redirection in a wireless network, the system comprising:
   means for receiving a call from a first device of a first party to a second device of a second party, the second device being a wireless device;
   means for attempting to deliver the call to the second device;
   means for determining if the call is an anonymous call by at least one of a home location register and a service control point;
   means for forwarding the call to an intelligent peripheral if the call is an anonymous call;
   means for requesting identification information from the first party;
   means for receiving the identification information;
   means for attempting to deliver the call to the second device;
   means for notifying the second device of the call;
   means for requesting connection information from the second party and whether the second device will receive the call;
   means for receiving the connection information; and,
   means for selectively connecting the call based on the connection information.

13. The system as set forth in claim 12 wherein the means for determining if the call is an anonymous call comprises means for analyzing a location request message.

14. The system as set forth in claim 12 wherein the means for determining if the call is an anonymous call comprises means for analyzing a send routing information request message.

15. The system method as set forth in claim 12 wherein the means for determining if the call is an anonymous call comprises means for accessing a database module.

16. The system as set forth in claim 12 wherein the means for determining determines based on whether calling party information is provided by the first party.

17. The system as set forth in claim 12 wherein the means for determining determines based on a presentation indicator.

18. The system as set forth in claim 12 wherein the means for attempting to deliver the call comprises means for sending a location request.

19. The system as set forth in claim 18 wherein the location request does not identify the first party or includes a presentation indicator of the first party marked as restricted.

20. The system as set forth in claim 18 wherein the location request identifies the calling party as a network element.

21. The system as set forth in claim 20 wherein the network element is an intelligent peripheral.

22. The system as set forth in claim 18 wherein the location request takes the form of a send routing information message.

23. A method for anonymous call redirection in a wireless network including a switching element and at least one of a home location register and a service control point, the method comprising:

receiving a call from a first device of a first party to a second device of a second party, the second device being a wireless device;

attempting to deliver the call to the second device;

determining if the call is an anonymous call by the at least one of the home location register and the service control point;

forwarding the call to an intelligent peripheral by the switching element if the call is an anonymous call;

requesting identification information from the first party;

receiving the identification information;

attempting to deliver the call to the second device;

notifying the second device of the call;

requesting connection information from the second party and whether the second device will receive the call;

receiving the connection information; and, selectively connecting the call based on the connection information.

* * * * *